US005774153A

United States Patent [19]
Kuehnle et al.

[11] Patent Number: 5,774,153
[45] Date of Patent: Jun. 30, 1998

[54] DIGITAL PRECISION POSITIONING SYSTEM

[75] Inventors: Manfred R. Kuehnle, New London, N.H.; Steven O. Cormier, Leominster, Mass.

[73] Assignee: Heidelberger Druckmaschinen Aktiengesellschaft, Germany

[21] Appl. No.: 425,273

[22] Filed: Apr. 20, 1995

Related U.S. Application Data

[63] Continuation-in-part of Ser. No. 195,279, Feb. 14, 1994, abandoned, which is a continuation-in-part of Ser. No. 792,810, Nov. 15, 1991, Pat. No. 5,325,120.

[51] Int. Cl.⁶ .......................... B41J 2/385; G03G 13/04; G03G 9/08
[52] U.S. Cl. ............................ 347/129; 347/154
[58] Field of Search ...................... 355/3, 326; 347/154, 347/262, 116, 115, 119, 129; 226/19; 198/840

[56] References Cited

U.S. PATENT DOCUMENTS

| 304,533 | 9/1884 | Lieb | 492/21 |
|---|---|---|---|
| 426,862 | 4/1890 | Ross, Jr. | 492/21 |
| 763,251 | 6/1904 | Breck | 492/21 |
| 1,288,801 | 12/1918 | Barber | 226/175 |
| 2,814,487 | 11/1957 | Medkeff | 226/19 |
| 2,846,751 | 8/1958 | Woodward | 492/21 |
| 2,854,235 | 9/1958 | Mursch | 226/192 |
| 2,970,339 | 2/1961 | Hausman | 492/4 |
| 3,071,157 | 1/1963 | Robertson et al. | 226/22 |
| 3,096,949 | 7/1963 | Huffman | 242/571.1 |
| 3,106,767 | 10/1963 | Fox | 492/22 |
| 3,726,588 | 4/1973 | Moser | 399/165 |
| 4,864,461 | 9/1989 | Kasahara | 361/234 |
| 4,903,067 | 2/1990 | Murayama et al. | 347/129 |
| 5,000,364 | 3/1991 | Thimon et al. | 226/175 |
| 5,121,170 | 6/1992 | Bannai et al. | 198/671 |
| 5,151,737 | 9/1992 | Johnson et al. | 399/117 |
| 5,246,099 | 9/1993 | Genovese | 198/807 |
| 5,295,571 | 3/1994 | Van Den Bogaert et al. | 198/502.1 |

FOREIGN PATENT DOCUMENTS

| 2222846 | 10/1974 | France . |
|---|---|---|
| 59217881 | 5/1986 | Japan . |
| 59242966 | 6/1986 | Japan . |
| 2067523 | 7/1981 | United Kingdom . |
| 8300658 | 3/1983 | WIPO . |

*Primary Examiner*—N. Le
*Assistant Examiner*—Raquel Yvette Gordon
*Attorney, Agent, or Firm*—Cesari and McKenna, LLP

[57] ABSTRACT

A digital positioning system has a carrier in the form of a belt with a work surface and arrays of first and second conductors extending under that surface generally parallel to one another, each second conductor being spaced close to a first conductor to define a narrow gap between them. A voltage source applies a potential difference between the conductors to produce electrostatic fields which can attract and hold a substrate to said carrier work surface. Monitoring means are provided to enabling the longitudinal and lateral positions of the belt to be monitored to produce control signals to shift work elements operating on selected locations of the substrate at successive work stations to compensate for unwanted movements of the belt.

3 Claims, 4 Drawing Sheets

FIG. I

DIGITAL PRECISION POSITIONING SYSTEM

RELATED APPLICATION

This application is a continuation-in-part of Ser. No. 08/195,279, filed Feb. 14, 1994, now abandoned, which is a continuation-in-part of Ser. No. 07/792,810, filed Nov. 15, 1991, now U.S. Pat. No. 5,325,120.

FIELD OF THE INVENTION

This invention relates to a digital precision positioning system. It relates especially to a transport system with electrostatic substrate retention for printing presses and other apparatus requiring accurate positioning registration.

BACKGROUND OF THE INVENTION

In the world of machinery, there are various transport systems which are required to carry substrates or articles from one station to another in order to have a succession of operations performed on them. For example, in congruent area color printing (CAP), a paper substrate is moved from one fixed printing station to the next for the successive deposition of colors onto the paper, with the color dots making up the image being brought into precise registration at each successive printing station. Registration accuracy is required because the different colored inks which reside on top of one another act collectively as multiple filters which can produce a wide range of color hues when superimposed thusly. Typically, for a 50 $\mu m^2$ printing dot, it would be desirable to maintain registration to an accuracy in the order of ±5 $\mu$m.

Printing is not the only area in which the accurate transport of articles through successive workstations is of concern. For example, in integrated circuit manufacturing processes, semiconductor wafers have to be transported very precisely to successive fixed exposure, masking, etching and lead frame attaching stations in order to create the finished products. Any mispositioning of the wafers relative to the workstation results in wastage which can be quite costly to the manufacturer.

Depending upon the particular application, e.g., printing, masking, etc., the substrate carrier may be a belt or a cylinder. The carrier may even be a so-called moving floor type of conveyor in which one carrier section reciprocates relative to a stationary section with the latter section preventing any back sliding of the conveyed article during rearward motion of the moving section.

Classically, the requirement to accurately transport and position substrates and other articles has been solved using expensive and cumbersome precision fixating mechanisms which usually include mechanical grippers or vacuum holders to assure the retention of the substrate or other article on its carrier. Carrier devices such as the paper cylinders used in the printing industry are not only complicated and costly because of their elaborate internal gripping mechanisms, but also they limit system speed because the mechanical grippers with their actuators and cams impose serious cycle time restrictions. A further disadvantage of these classical devices is their tendency to damage the substrates or other articles which they are gripping or clamping. Additionally, both mechanically actuated retention mechanisms as well as vacuum operated suction devices are quite noisy and thus they tend to disturb personnel working in the vicinity of the machines.

In addition to holding the paper or other article to its carrier, the prior apparatus invariably also include a tracking mechanism for controlling the position of the moving carrier relative to the fixed workstation. In the case of a belt-type carrier, this usually involves sensing the lateral position of the belt relative to a reference position, and steering the belt toward the reference position using some kind of servo mechanism, all of which further complicates the overall system.

Due to the high positioning registration accuracy required for color printing applications, such belt-type transports are usually not used to advance the paper or other printing substrate from one printing station to the next because the belts still tend to wander laterally despite the presence of the aforesaid belt positioning servo mechanism. It would be desirable, therefore, to be able to provide a belt-type transport system which can achieve good positioning registration accuracy at printing or other work stations served by the transport.

There is also a need to be able to safely and reliably transport and position a variety of substrates such as paper and plastic sheets, thin foils and other usually planar media using minimum power and at operating speeds substantially in excess of the presently attainable speeds.

SUMMARY OF THE INVENTION

Accordingly, it is an object of the present invention to provide a digital precision positioning system which allows work to be performed on an article at a workstation very precisely.

Another object of the invention is to provide an improved system for transporting a substrate or other planar article to a workstation achieve accurate positioning registration.

Another object of the invention is to provide a positioning system of this type which uses non-mechanical means to retain the substrate to the system's substrate carrier.

A further object of the invention is to provide such a system which is able to safely and reliably transport a variety at different articles including thin and fragile substrates.

Another object of the invention is to provide a positioning system which is particularly applicable to color printing applications.

Another object of the invention is to provide a precision positioning system which is quiet and efficient in that it requires only a minimum amount of power.

Yet another object of the invention is to provide a system of this type having a belt-type carrier to which does not slip relative to its driving roller.

Still another object of the invention is to provide a digital positioning system which, while using a driven belt carrier, can transport articles through successive work stations and achieve accurate positioning registration at the work stations.

Other objects will, in part, be obvious, and will, in part, appear hereinafter.

The invention accordingly comprises the features of construction, combination of elements and arrangement of parts which will be exemplified in the following detailed description, and the scope of the invention will be indicated in the claims.

Briefly, our positioning system comprises a movable carrier for conveying a substrate or other article through one or more work stations at which various operations are performed at selected positions on the substrate. We will specifically describe such a system incorporated into a printing press for printing in color on a printing substrate such as paper transported through the press. It should be understood, however, that various aspects of the system may be used in other applications that require accurate positioning of a substrate or other planar article. Also, we will dwell primarily on a positioning system incorporating a belt-type substrate carrier. However, various features of the invention can also be applied to transports utilizing drum-type carriers or reciprocating (moving floor) carriers.

The belt-type carrier, in the form of a flexible belt loop, is stretched between a pair of rollers, at least one of which is rotated by suitable motor drive. The upper stretch of the belt loop passes through a plurality of work stations. In the case of a press, the work stations consist of a succession of printing stations which are arranged to apply different color printing in the form of color pixels or dots to a substrate, e.g., paper sheets, supported by the carrier.

In order to maintain the position of the substrate relative to the carrier, the belt loop incorporates an electrostatic hold down grid. This is provided by a pattern of interlaced electrodes which are embedded in the belt. An electrical potential is applied to adjacent ones of these electrodes thereby forming powerful electrostatic fields between the electrodes. The field lines extend above the surface of the belt and interact with the substrate by inducing a capacitive charge in the substrate which, in turn, produces a relatively powerful electrostatic attraction of the substrate for the belt. This force combined with the coefficient of friction existing at the substrate-belt interface prevents the substrate from shifting relative to the belt.

A similar electrostatic hold down grid may be provided on the belt drive roller to minimize belt slippage and drift.

As noted previously, in CAP printing operations, it is very important to superimpose color dots on top of each other in precise registration at the various printing stations. For this reason, belt-type carriers are generally not used to transport the printing substrate through the press because the belt tends to wander laterally and the speed of the belt may also vary for one reason or another. However, the present positioning system, while using a belt-type carrier, avoids these problems by forming in the belt, along with the aforementioned electrodes, a cluster of fine longitudinal parallel lines which extend all around the belt loop preferably near an edge thereof. These lines are sensed by an optical sensor whose working surface is engraved with a line pattern which forms with the lines on the belt an interference filter which can detect the slightest lateral motion of the belt and produce an output signal representative of the lateral drift of the belt. Also, embedded in the belt is a longitudinal series of timing marks which forms an optical clock track that extends all around the belt loop. These marks are detected by a second optical sensor which produces an output signal indicative of the speed of the belt. With these features, it is possible to predict precisely the position of the belt at any point in time, even when the transport speed varies, and hence, to initiate any action required at a certain position of the belt.

The two signals are fed to a controller which thereupon may 1) control the lateral position of the belt to some extent, by means of a unique variable geometry roller to be described and 2) adjust minutely the lateral and longitudinal positions of the work members at the various work stations so that they all operate at precisely the correct locations on the substrate being transported by the belt.

In other words, the present system, after electrostatically holding the substrate firmly in place on the belt or other carrier, maintains accurate position registration for the substrate as it arrives at the successive workstations. For this, the system tracks the motion of the belt or other carrier and applies signals to the various workstations so that the work member at each workstation is located precisely at the correct location relative to the substrate when the substrate arrives at that workstation. The system is thus able to provide "predictive positioning" and the precise conjunction of the substrate position with the work member position to an accuracy of less than ±5 µm.

When the belt version of my transport system is incorporated into a color press, the drift of the belt as it wanders laterally can be predicted because of the inherent periodicity of the control mechanism which adjusts the belt continuously as it moves. Accordingly, the position of the print head at each printing station, which head operates in conjunction with a print cylinder at that station, is continuously adjusted in anticipation of the arrival of a print dot from the preceding station so that the next dot will always be superimposed precisely on the preceding dot. In essence, the print heads at the various print stations of the press are in continuous microscopic motion, shifting laterally as they write images on the respective print cylinders at those stations in accordance with calculations made by the system controller which integrates the knowledge of belt motion and its periodicity of adjustment with that of the necessary timing and location of the successive print heads. With this method of anticipatory registration control, it is possible to print with color superposition accuracies never achieved before using classical printing processes which typically achieve registration accuracies no better than ±100 µm.

Thus, in this digital positioning system, the print heads at the print stations are movably mounted opposite the upper or lower stretch of the belt and they follow, governed by electronic signals from the system's controller, the advancing paper sheets on the belt so as to position themselves in advance over the arrival point of a pixel locus on the operative paper sheets so that they can print precisely at this locus. This anticipatory or predictive movement of each print head is accomplished by sensing the advance motion of the belt through a clock track on the belt whose pitch is a subdivision of the pixel frequency while, at the same time, sensing the lateral direction and the progression angle (skew) of the belt so as to induce a lateral shift of each print head to anticipate the trajectory of the pixel position as the printing substrate is transported by the belt to the print position opposite the operative print head.

Of course, since the print cylinders are of round configuration and the print head is usually at the top of the cylinder, there is a certain circumferential distance to be covered between the moment of digitally writing a pixel onto the print cylinder and the arrival of this position at the site below where the pixel is transferred to the paper on the belt. To meet this accuracy requirement, the print cylinders are equipped with an angular encoder which can feature as many as 84,000 divisions per revolution. Accordingly, with the belt clock track and the known travel distances, as well as the partial circumference of the print cylinder which must be traversed for printing onto the paper, the interactive positions of the various elements are predictable and computable for each successive print station, thus allowing the superposition of successive color layers onto the printable pixel site on the paper.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION OF ILLUSTRATIVE EMBODIMENTS

Figure 1:
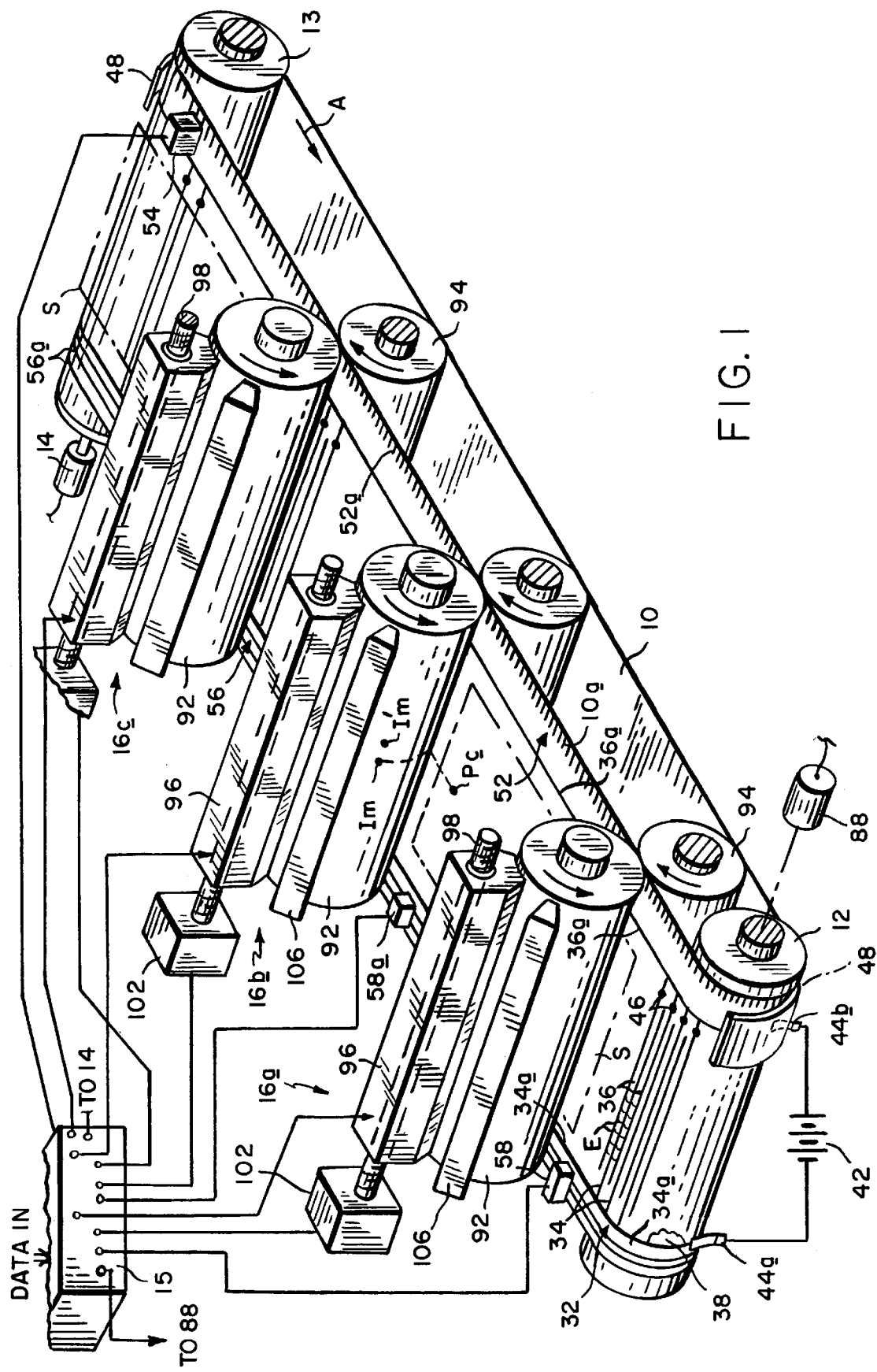
FIG. 1 is an isometric view of a color press incorporating a positioning system made in accordance with this invention.

Refer now to FIG. 1 which shows the digital positioning system incorporated into a three color printing press. It should be understood that essentially the same system may be used in a four or five color press or in other applications in which planar substrates have to be moved to successive work stations at which various position-sensitive operations have to be performed on the substrate.

The system includes a flexible, one piece or endless, molded belt loop 10 made of a suitable strong, resilient, tear-resistant material such as polyester and acrylic. Belt 10 is stretched between a pair of rollers 12 and 13, one of which rollers, i.e., roller 13, may be rotated by a suitable motor 14 under the control of a system controller 15 which includes a digital memory. Spaced along the belt loop 10 are similar print stations 16a, 16b and 16c capable of printing three different colors on substrates S, such as paper sheets, supported on the upper stretch 10a of the belt loop. For example, the print stations 16a to 16c may print the subtractive colors cyan, magenta and yellow, respectively.

When the press is in operation, the belt loop 10 is rotated in the clockwise direction as indicated by the arrow A in FIG. 1. Substrates S, are deposited successively onto the upper stretch 10a of the belt loop by a suitable feeder (not shown). Suitable optical sensors (not shown) are provided for detecting the positions on the belt of the leading edge and a side edge of each substrate S deposited on the belt. The position signals from these sensors are forwarded to controller 15 in order to achieve print dot congruency as will be described. As each substrate S is transported by belt loop 10 through the successive printing stations 16a to 16c, images in different colors are printed on the substrate. As stated above, in the illustrated apparatus these colors are cyan, magenta and yellow. In fact, these three printed images represent the three color components or separations of an original color document or image and for CAP printing, it is critical that the images be printed in exact registration on each substrate S. The present system assures this first, by holding each deposited substrate fast to the belt loop 10 as that substrate is transported through the successive printing stations 16a to 16c and second, by controlling the printing operation carried out at each printing station to account for any wanderings, or variations in speed, of the belt loop 10.

To achieve the first objective, the belt loop 10 incorporates an electrostatic hold-down grid shown generally at 32 which grips each substrate S as the substrate is deposited on the left end of the belt loop, holds the substrate flat against the belt as it is transported through the press and releases the substrate when the substrate reaches the exit or right hand end of the belt loop.

Figure 2:
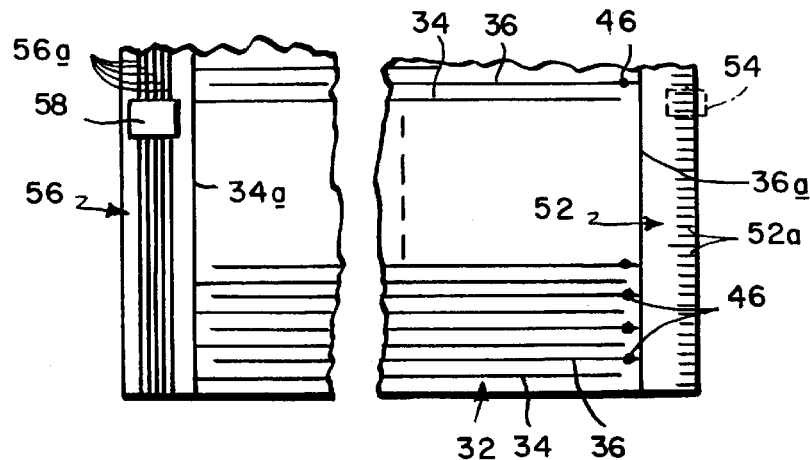
FIG. 2 is a fragmentary plan view on a larger scale of the carrier belt in the FIG. 1 system.

As best seen in FIGS. 1 and 2, the hold down grid 32 comprises a series of spaced-apart, interlaced, strip electrodes 34 and 36 which extend across the belt loop 10, the electrode series extending all around the belt loop. Corresponding ends of the electrodes 34 are connected to a common electrode or bus 34a which extends all around the belt loop adjacent to the left hand edge thereof. A similar common electrode or bus 36a connects the electrodes 36 near the right hand edge of the belt loop. The electrodes and busses may be of silver printed or plated onto the belt loop using conventional methods.

Preferably, the electrodes are situated under a relatively high coefficient of friction film 38 (FIG. 1), e.g., silicone rubber, applied to at least the outer surface of the belt loop 10. This film 38, which is quite thin, e.g., 50 $\mu$m, not only enhances the holding action of the belt loop 10 for the substrate S, but also protects the electrodes from chemical erosion or the effects of condensation which may be present during certain operating conditions. Film 38 also insulates the electrodes and prevents direct manual contact with those electrodes.

During operation of the apparatus, a power supply 42 supplies a potential difference of about 1000 volts to busses 34a and 36a which are not covered by film 38. The power supply may be connected to those electrodes by brushes 44a and 44b as shown in FIG. 1 or by appropriate conductive wheels in rolling contact with busses 34a and 36a. Those connections can also be achieved by "capacitive coupling", whereby charges are induced into the hold down grid by the displacement of electrons and holes using capacitor plates (not shown) located in close proximity to the grid at some convenient location such as at the end of the belt loop where it turns around the roller 12 or 13.

When the electrodes 34 and 36 are energized, they produce powerful electrostatic fields all along their lengths. The field lines E reach above the surface of the film 38 and interact with the substrate S deposited on the belt loop 10 so as to induce a capacitive charge in the substrate. This, in turn, gives rise to a powerful electrostatic attraction of the substrate for the belt. This attraction is, however, effective only at short distances from the belt such as the thickness of the substrate and is effective only when the substrate is in intimate planar contact with the belt.

Thus, the electrostatic hold down grid 32 coupled with the high friction film 38 firmly fixes the positions of the substrates S deposited on the belt loop 10. Furthermore, the electrostatic hold down feature is effective over the entire area of the substrate.

In the following discussion, we shall consider the magnitude of the attractive force by which a substrate S is held to the belt loop surface.

Assume that the electrodes 34 and 36 have a width a and that the film 38 has a thickness b and a relative dielectric constant $\epsilon_r$. If a substrate S, i.e., a paper sheet, is placed upon the belt loop and a voltage of magnitude V is applied between adjacent conductors 34, 36, an attractive force is experienced by the paper sheet. Because of friction, the paper can now no longer be moved readily relative to the surface of the belt loop. The force necessary to shift the paper parallel to the surface is equal to the attraction force multiplied by the coefficient of friction existing between the sheet and the belt surface. The coefficient of friction is usually a number less than one; however, numbers somewhat larger that one can relatively readily be obtained. By proper design one can maximize the attraction force.

In the unlikely case where the paper sheet is totally insulating, the only effect responsible for attraction of the paper to the belt surface is the known attraction mechanism whereby a polarizable medium is attracted in a gradient of the electric field towards the regions with larger field. A dipole moment is established by the field in the paper. As a consequence bound charges appear at the bottom and top surface of the paper. If the field at the bottom of the paper is stronger than it is at the top of the paper, than the charges at the bottom are more strongly attracted then the top charges are repulsed. A net force thereby acts on the paper.

A stronger attraction results if the paper is slightly conducting which is invariably the case in practice. A positively biased metal strip electrode 36 will induce a negative charge in the paper while the adjacent negative metal electrode 34 will induce an equal amount of positive charge in the paper. Since the two charges are equal, the paper needs not to be connected to any ground; no net charge will have to enter or leave the paper. Yet, the paper can be considered to reside at ground potential, i.e., half way between the positively and negatively biased electrodes of the belt.

Let us now calculate the capacitance between one electrode and the paper. This problem has been solved by complex conformal transformation (P. N. Wolfe, Proc. IRE, October 1962, pp 2130–2133). In the case of a>>b, one obtains $$C = \epsilon_o \epsilon_r \frac{a + 0.88b}{b} L \quad (1)$$

In Equation 1, L is the length of the strip of metal, $\epsilon_o$ and $\epsilon_r$ are the dielectric constants of free space and the relative dielectric constant of the film 38. the contribution of 0.88b in Equation 1 represents the capacitance edge effect of the electrode. For a large width a, the edge effect can be neglected. If in a unit area, there are N electrodes, then the above expression needs to be multiplied by N to give the capacitance per unit area. Thus, the energy stored in the capacitor becomes $$w = \frac{1}{2} CV^2 = \frac{\epsilon_o \epsilon_r}{2} V^2 \left( \frac{a}{b} + 0.88 \right) NL \quad (2)$$

The force by which the paper is attracted to the metal electrodes can be calculated as follows: if the paper sheet is lifted a small distance above the belt, then work is done against the electrical forces. The amount of work done is equal to the change in electrical energy. Thus, $$\text{FORCE} = -\frac{\partial w}{\partial b} = \frac{\epsilon_o \epsilon_r}{2} \frac{V^2}{b^2} NaL \quad (3)$$

In the above Equation 3, NaL is simply the fractional area of the belt loop that is covered by metal. Thus, the force is independent of the number of electrodes if electrodes of half the width would give the same force. This conclusion would only be incorrect if the paper conductivity were so small that an equipotential condition could not be established over the entire paper. Extremely poor paper conductivity would favor more and narrower electrodes 34, 36. In Equation 3, the force would come out in units of joule/cm, if volts and cm would be used, and if the dielectric contact $\epsilon_o$ would be given as 8.85E10$^{-14}$ amp sec/(volt cm). To convert to grams force, the number given in joule/cm could be first converted to dynes by multiplying by 10$^7$ and in a second step, the dyne units could be converted to grams by dividing by the acceleration of gravity, i.e., 981 cm/sec$^2$.

Although the above-described force firmly pins the substrate S to the belt loop 10, it should be appreciated that the substrate can be peeled readily from the belt 10 because the paper holding force at the line of departure of the paper from the belt loop is small because the width of the line is less than the unit area. With this in mind, it is obvious that at the end of the belt loop 10, a substrate S can be removed easily in a departure path, which, in most cases, will be tangential to the roller 13. In most cases, therefore, it suffices to have the substrate S possess the stiffness of a normal sheet of paper which will cause it not to be carried around the belt roller 13, but rather to be ejected in a straight line direction off the exit end of the belt loop 10 as shown in FIG. 1. Film 38 may be selected to provide the needed coefficient of friction, i.e., stickiness.

When very thin and flimsy substrates S are being positioned, provision may be made for shutting off the electrostatic hold down grid 32 at any desired zone or location along the belt path, or to assure that the substrates will be picked up and discharged from the transport at the opposite ends of the belt loop 10. In other words, a flimsy substrate has no inherent rigidity. Therefore, it could be carried around the roller 13 together with the belt and move to a possibly undesirable position under the belt loop. Thus, to help the substrate S separate from the belt loop, the hold down grid 32 may be shut off by disconnecting the appropriate electrodes 34 and/or 36. In the apparatus illustrated in FIG. 1, this is accomplished by connecting each electrode 36 to its bus 36a by way of a small photoelectric resistor 46. The resistance of the resistor is inversely proportional to the intensity of light incident on the resistor. Thus, each resistor 46 essentially disconnects its electrode 36 from bus 36a in the absence of light.

Figure 4:
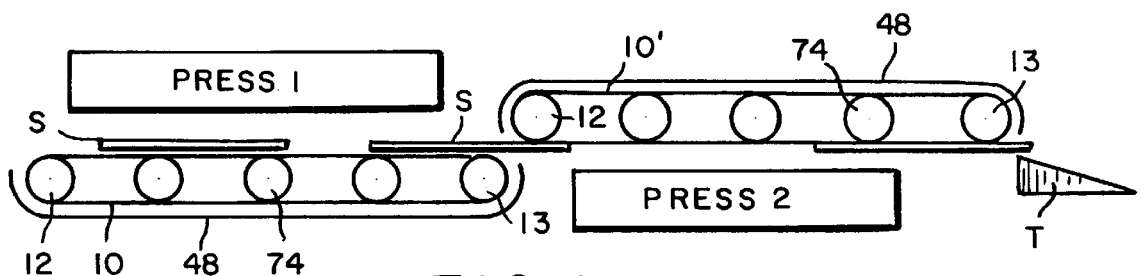
FIG. 4 is a diagrammatic view of a belt-type positioning system to enable two-sided printing.

The illustrated electrostatic hold-down grid 32 is disabled at a selected location or zone along the belt path by shielding the photoresistors 46 from light at that location. For example, to disable the grid below the belt stretch 10a, a light shield 48 may be positioned underneath and around the ends of the belt path as shown in FIGS. 1 and 4, allowing the substrate S to be picked up and released by the belt loop 10.

As the present system assuredly fixes the position of the substrates S on the belt loop 10, it also controls closely the lateral position of the belt and the printing of the images on the substrates to compensate for any residual movements of the belt loop that could prevent proper registration of the images being printed on the substrates by the printing stations 16a to 16c. For this, there is incorporated into the belt loop 10 a timing track 52 consisting of a series of opaque timing or clock marks 52a spaced along the belt loop preferably at an edge thereof as shown in FIGS. 1 and 2. The track 52 may be laid down on the belt loop at the same time as the grid 32. These timing lines are detected by an optical detector 54 which produces corresponding output signals to the controller 15. Thus, the timing track 52 and detector 54 constitute the master clock for the system as a whole.

Also incorporated into the belt loop 10 along with track 52, preferably near an edge thereof, is a belt position track shown generally at 56 in FIGS. 1 and 2. Track 56 consists of a cluster of narrow, spaced-apart parallel opaque lines 56a which extend all around the belt loop 10. In the illustrated system, there are five such lines 56a in track 56. These lines are sensed by a measuring detector 58 mounted to the machine frame just beyond roller 12. Detector 58 may be a grating type detector similar to the one in U.S. Pat. No. 3,584,015, whose contents are hereby incorporated by reference herein, which receives an image corresponding to the track 56 pattern and which, therefore, also has the structure of a grating. By means of suitable pickup elements, the position of the grating-shaped image of track 56 relative to the grating-shaped detector 58 produces a signal from the detector that is indicative of the lateral position of the belt relative to a reference position such as the machine centerline. The detector output is accurate to less than 1 μm. The signal from detector 58 is applied to controller 15 and is used not only to minimize the lateral wanderings of the belt, but also, as will be described, to control the printing on the substrates S by the printing stations 16a to 16c so that those stations print in exact registration on the substrates S which, as noted above, are pinned electrostatically to the belt loop stretch 10a.

To maintain the lateral position of the belt, the present system incorporates a unique roller 12 which can grow in diameter at one end of the roller and shrink in diameter at the other end, or vice versa to shift the belt 10 laterally. The system is able to achieve a minute conical deformation of roller 12 which induces an immediate lateral shift of the belt 10 as it moves around the semi-circumference of roller 12. The lateral drift of the belt is continuously monitored and a servo-system adjusts the conicalness of the roller 12 to maintain the belt at a desired position, e.g., the machine centerline.

Figure 3A:
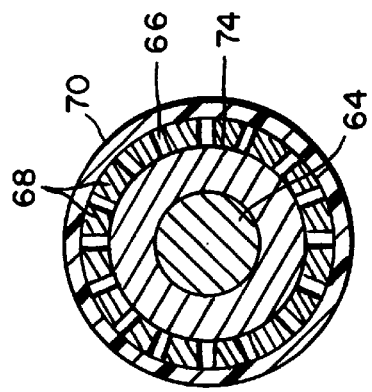
FIG. 3A is a sectional view taken along line 3A—3A of FIG. 3.
Figure 3:
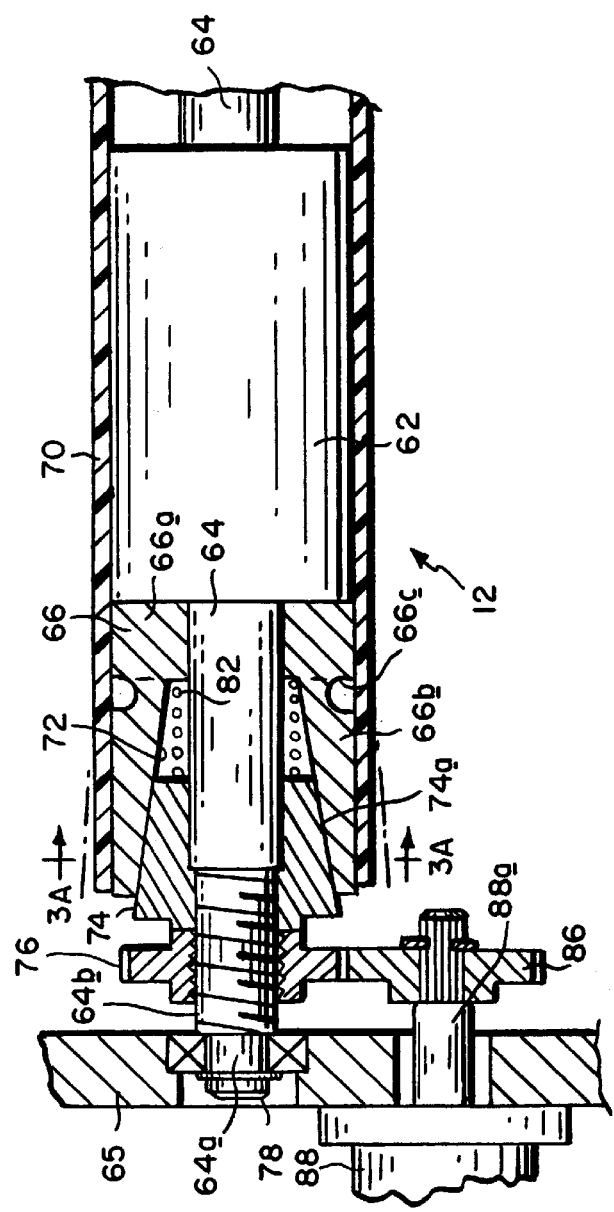
FIG. 3 is a fragmentary sectional view of a variable geometry guide roller used in the FIG. 1 system.

Refer now to FIGS. 3 and 3A which show the roller 12 in greater detail. In FIG. 3, only the left end segment of the roller is shown because the right end segment of the roller is a mirror image of the left segment. Roller 12 comprises a cylindrical central body 62 having shafts 64 projecting axially from opposite ends of that body. A reduced diameter end 64a of each shaft 64 is journalled in the machine frame 65. Also, a shaft segment 64b just inboard the machine frame is threaded. Slidably supported on each shaft 64 is an annular roller end member 66. Each member 66 has a base 66a slidably received on the corresponding shaft 64 and which butts against the adjacent end of body 62. Extending axially from base 66a is an annular cylindrical section 66b having a necked-down segment 66c adjacent base 66a. As best seen in FIG. 3A, section 66b is slitted lengthwise to form a multiplicity of fingers 68 each of which is free to flex radially about an axis at segment 66c. Each end member 66 has the same outside diameter as the roller body 52 and thus forms a variable diameter extension thereof. The roller body 62 and end members 66 are covered by a sleeve 70 of a resilient material such as rubber.

As shown in FIG. 3, the inner wall 72 of end member section 66b is tapered to form a conical surface whose radius decreases with distance from the end of the roller 12. Slidably positioned on each shaft 64 for engagement with surface 72 is an annular wedge 74 having a conically shaped exterior surface 74a whose cone angle corresponds to that of surface 72. Also, a spur gear 76 having a threaded axial opening 78 is threaded onto each shaft segment 62b between wedge 74 and the machine frame 65. Thus, when a gear 76 is rotated in one direction, it will push the corresponding wedge 74 further into the adjacent end of the roller 12. This action will cause the associated end member section 56b to extend radially thereby increasing the diameter of the roller 12 at to the corresponding end of the roller. On the other band, when the gear 76 is rotated in the opposite direction, it exerts no force on its wedge 74 which is thereupon pushed outward toward the corresponding end of the roller by a coil spring 82 compressed between each wedge 74 and the associated roller end member section 66a. Resultantly, the diameter of that end of roller 12 will be reduced.

Each gear 76 may be rotated in one direction or the other on its shaft 64 by a meshing gear 86 which rotates with the shaft 88a of a synchronous pulsed reversible servo motor 88 mounted to the machine frame 65. Each motor 88 may rotate its gear 76 faster or slower than roller 12 which will move the corresponding wedge 74 in or out to adjust the conicalness of the corresponding end of roller 12.

It should be understood that the end member 66b is shaped and positioned on its base 66a such that when the associated wedge 64 is retracted outward, the resilient roller sleeve 70 will shrink so that the corresponding end of the roller 12 may have a smaller diameter than the mid portion of the roller. Thus by appropriately positioning the wedges 74 on shafts 64, the opposite end segments of the roller can each be controlled to have a diameter which is smaller, equal to or greater than the diameter of the middle segment of the roller. In other words, by appropriately positioning the wedges 74 at the opposite ends of the roller, the conicalness of the roller as a whole may be varied in one axial direction or the other.

In the illustrated system, the motors 88 that adjust the conicalness of roller 12 are controlled by a standard servo circuit in controller 15 (FIG. 1) in accordance with the output signals from the detector 58 which monitors the lateral drift of belt stretch 10a. The servo tends to maintain the belt at a selected lateral position, e.g., the machine centerline, within very close tolerances. As soon as a lateral shift of the belt is detected by detector 58, a signal is applied to controller 15 which controls one or both of the motors 88 to move the wedges 74 in or out to adjust the conicallness of roller 12 by just the required amount to return the belt to its center position.

While the motion of belt 10 is closely controlled to minimize lateral movement of the belt as just described, provision is also made in the present system for compensating for any residual movement of that belt that might occur due to belt irregularities or small delays or perturbations in the belt position servo circuit.

Referring to FIG. 1, as noted above, the printing stations 16a to 16c are all the same except that they print using different color inks, e.g., the subtractive color inks cyan, magenta and yellow. Each printing station includes a print cylinder 92 disposed above belt stretch 10a and an anvil cylinder 94 located parallel to cylinder 92 below belt stretch 10a. All of the cylinders 92, 94 are rotatably supported by the machine frame parallel to the belt rollers 12 and 14 such that the upper stretch 10a of the belt loop 10 is in rolling contact with the cylinder couple at each print station.

Each print station also includes a print head 96 supported very close to the cylindrical surface of cylinder 92 by a lead screw 98 rotatably mounted to the machine frame such that it is parallel to the cylinders 92, 94. The lead screw 98 may be rotated in one direction or the other by a reversible step motor 102 which receives drive signals from controller 15.

The print head, print cylinder and controller 15 may be of the type to serve the microtunnel-type print elements described in U.S. Pat. No. 5,325,129, and in the co-pending application of even date herewith entitled Microplasma Signal Source, the contents of which are hereby incorporated by reference herein.

During the operation of the apparatus, the print heads write electronic images on the associated print cylinders 92 corresponding to the primary color components or separations of an original document or image, the images being written line by line as the print cylinders 92 rotate. The image written on each print cylinder 92 is developed by applying electrostatic thermoplastic ink to the surface of the cylinder from an ink source 106 at an inking station. As described in said patent and parent application, the ink adheres only to the surface areas of the cylinder 92 that were charged by the print head 96. When the inked portions of a rotating cylinder 92 encounter a substrate S passing through the corresponding inking station, the ink is transferred to that substrate. As in most presses, the position of the image written on each print cylinder 92 is coordinated with the position of the substrate S on the substrate carrier such that the image printed on the substrate is located at the correct position on the substrate.

A print signal will originate when the paper detectors furnish a signal which advises the controller 15 that a substrate S has been deposited on belt loop 10 and is advancing toward the first print station 16a. That signal causes the memory in controller 15 to release a data stream to the microtunnel-type write elements of the write heads 96 at the write stations 16a to 16c where the signals for each pixel must arrive at the precise time required for the anticipatory cycle of pixel travel, i.e., for the pixel to be written at the proper locations on the print cylinder 92.

A typical write head 96 may be in the order of 1 meter long and contain as many as 20,000 write elements with each element receiving its control impulse from the digital memory. Typically, the memory will instruct the write element how much each density it should position on the surface o the operative print cylinder 92 so as to dictate, in turn, the amount of ink which will be picked up from ink source 106 while the print cylider circumference is advancing of the contact line with substrate S.

Still referring to FIG. 1, when printing using an electronic print head 96 like the ones described in the above patent, the print head is invariably stationary. In accordance with this invention, however, the print head is movable laterally on lead screw 98 to account for any residual lateral drift of the belt loop 10 that may occur due to any lead or lag in the servo circuit controlling belt position. More particularly, the output signal from the detector 58 together with the signal from a second similar detector 58a both of which monitor belt position are used to shift each print head 96 to compensate for any such drift. When the belt loop 10 drifts from a selected reference position, e.g., the machine centerline, the controller 15, which receives the output signals from detectors 58 and 58a calculates the vector movement of the belt 10 in the direction of travel and applies appropriate drive signals to the step motors 102 which rotate the lead screws 98. Rotations of the lead screws shift the positions of the corresponding print heads 96 laterally so that the electronic image dots being written on the print cylinders 92 are repositioned laterally to compensate for the belt drift. At the same time, the timings of the writings by print head 96 of the image dots on the cylinders 92 are adjusted to compensate for any speed variations of the belt loop 10 as detected by the clock track detector 54.

During operation of the apparatus, successive substrates S are fed to the upper belt stretch 10a at the entrance end of belt loop 10 to which they firmly adhere due to the high friction film 38 on the belt and the electrostatic hold down grid 32. The controller 15 coordinates the feeding of each substrate onto the belt loop with the printing operations being carried out at the printing stations 16a to 16c so that the images are centered properly on the substrate. As the substrate approaches the first printing station 16a, controller 15 controls the print head 96 at station 16a so that it writes an electronic image on the print cylinder 92 at that station which image is inked by the cyan ink source 106 so that when the substrate S reaches the printing station 16a, the inked image will be transferred to the substrate as the substrate passes between the cylinders 92 and 94 at that station. During this time, the controller 15 receives signals from detectors 54, 58 and 58a indicating the lengthwise position and lateral position of the belt stretch 10a. Using this information, the controller determines if the image being written onto the print cylinder 92 has to be shifted axially or circumferentially on the cylinder in order to compensate for any belt position or speed changes. If the belt has drifted laterally, the controller computes the amount of the drift and the longitudinal belt position and delivers a drive signal to step motor 102 to shift the print head 96 in one direction or the other to compensate for that drift.

Similarly, if a belt speed change has been detected, the controller 15 controls the timing of the writing operation carried out by the print head to adjust the circumferential positions of the image dots on the print cylinder 92 to compensate for the belt speed changes. Thus, as the substrate S passes through the first print station 16a, a cyan image will be printed at the proper location on the substrate S despite unwanted belt movements between the time that the substrate is deposited on the belt and the time that the substrate is processed by the print station 16a.

In like manner, as the substrate proceeds from print station 16a to print station 16b, the system continues to monitor the belt movements and to adjust the position and/or timing of the print head 96 at the latter station so that by the time a particular print dot or pixel on the substrate reaches the print station 16b, the print head 96 at that station will have been adjusted position-wise and timing-wise so that the print head writes the corresponding magenta image dot at the proper location on the print cylinder 72 at station 16b so that it will be superimposed on the cyan print dot on substrate S when that print dot reaches the print station 16b.

The drift of the belt as it wanders can be predicted because of the inherent periodicity of the control by the servo system which adjusts the belt continuously as it travels. Accordingly, each write head 96 which operates in conjunction with the associated print cylinder 92 may be adjusted continuously in anticipation of the arrival of a print dot so that the next dot will always be superimposed exactly onto the preceding dot. The controller 15 calculates the speed of the belt, the distance of travel of each print dot as well as the position of the dot being written on the print cylinder so that the two can converge simultaneously at the correct location on the substrate. In other words, the writing heads are in continuous microscopic motion shifting laterally as they deposit their signals on the respective print cylinders in accordance with the calculations from the controller.

For example, if belt stretch 10a should drift to the left as it is transporting the substrate S from print station 16a to station 16b, its drift would be detected by detector 58 and passed on to controller 15. The controller which knows the position of the belt stretch 10a from the signals provided by detectors 54, 58 and 58a will compute the amount by which the print head 96 at the printing station 16b has to be moved leftward in order to write a corresponding magenta image dot $I_m$ on cylinder 92 which will be superimposed on the print dot $P_c$ that was printed on the substrate at station 16a. In other words, as shown in FIG. 1, without such correction, the print station 16b would write an image dot $I'_m$ on cylinder 92 which would print to the right of the print dot $P_c$ on substrate S. With this invention however, the print head 96 is shifted to the left by the same amount as the belt drift so that the image dot $I_m$ which corresponds with the print dot $P_c$ will be superimposed on the latter dot.

This process continues as the substrate is transported through successive print stations of the press so that when the substrate leaves the press, it carries a 3-color print with all of the print dots being in proper registration on the substrate.

By employing this principle of "predictive positioning", our system greatly exceeds, in the area of color printing, the presently attainable accuracies of print registration which are typically only in the order of ±100 μm.

The belt-type transports described above can also be used to facilitate printing on both sides of a substrate. For this, two such transports can be arranged in series as shown in FIG. 4 such that the upper stretch of one belt loop lies in the same plane as the lower stretch of the other belt loop. A substrate S deposited on the belt loop 10 of the left hand transport may be conveyed by that belt loop through a first press which prints on the upper side of the substrate as described above. At the end of that belt loop, this substrate will be handed off to the right hand transport whose belt loop 10' carries an electrostatic hold down grid similar to grid 32 in FIGS. 1 and 2. In the latter transport however, the grid is activated in the zone at the underside of the belt loop so that the substrate will be suspended from the lower stretch of that belt loop and carried past a second press which can print on the other side of the substrate. At the exit end of the right hand transport, the substrate may be handed off to a suitable inclined tray T.

Of course, a switchable electrostatic hold down grid may also be incorporated into the cylindrical surface of a paper drum or cylinder in order to pick up and let off a substrate from the drum or cylinder in the same manner described above in connection with belt loop 10.

Figure 5:
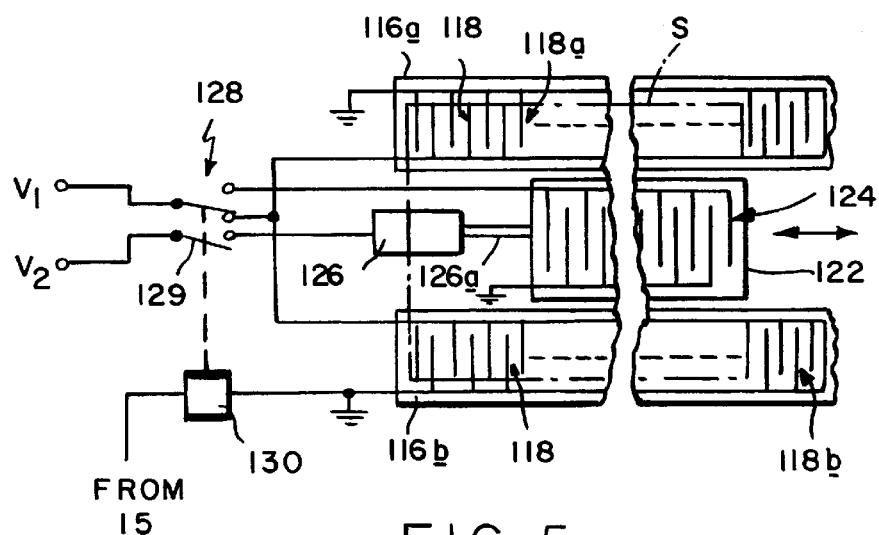
FIG. 5 is a similar view of a reciprocating-type positioning system incorporating our invention.

Refer now to FIG. 5 which illustrates a reciprocating or moving floor-type transport incorporating my electrostatic hold-down grid. This transport includes a pair of spaced apart, parallel, stationary side plates 116a and 116b which incorporate electrostatic hold-down grids 118a and 118b. Slidably positioned between the side plates 116a and 116b is a reciprocatable plate 122 which also carries an electrostatic hold-down grid 124. Plate 122 is reciprocated back and forth parallel to plates 116a and 116b by a linear actuator 126 whose armature is 126a connected to one end of plate 122. The stationary hold-down grids 118a and 118b are electrically connected in parallel to a voltage source $V_1$ by way of one terminal of a double throw switch 128. The other terminal of switch 128 connects the grid 124 on the movable plate 122 to that same voltage source. The actuator 126 is connected to a second voltage source $V_2$ by way of a second switch 129, the positions of both switches 128 and 129 being controlled by a relay coil 130.

When the actuator 126 is energized, its armature advances plate 122 toward the right and when the actuator is de-energized, an internal spring (not shown) biases the armature 126a and plate 122 to a retracted home position. It is apparent from FIG. 5 that when the relay 130 is energized, say, by a control signal from controller 15 (FIG. 1), switch 129 closes thereby energizing the actuator and causing plate 122 to move rightward to its advanced position. At the same time, the relay 130 actuates the switch 128 so that it connects the hold-down grid 124 on the moving plate 122 to the voltage source $V_1$ and disconnects the hold-down grids 118a and 118b on plates 116a and 116b from that voltage source. Therefore, a substrate S positioned on the transport is adhered to the moving plate 122 and is caused to advance with that plate.

On the other hand, when relay 130 is de-energized, switch 129 opens thereby de-energizing the actuators so that plate 122 moves leftward toward its retracted or home position. At the same time, relay 130 moves switch 128 to its other position so that it disconnects the hold-down grid 129 from the voltage source $V_1$ and connects the grids 118a and 118b to that voltage source. Thus, as plate 122 retracts, the substrate S is released from plate 122 and pinned to plates 116a and 116b so that it stays in its advanced position. Subsequent reciprocations of the movable plate 122 coupled with the 180° out-of-phase switching on and off of the movable and stationary hold-down grids continue to advance the substrate S toward the right in FIG. 5. Of course, a reciprocating-type transport that moves over much smaller distances can be envisioned which uses piezoelectric vibrators or benders to move the movable member(s) of the transport.

Figure 6:
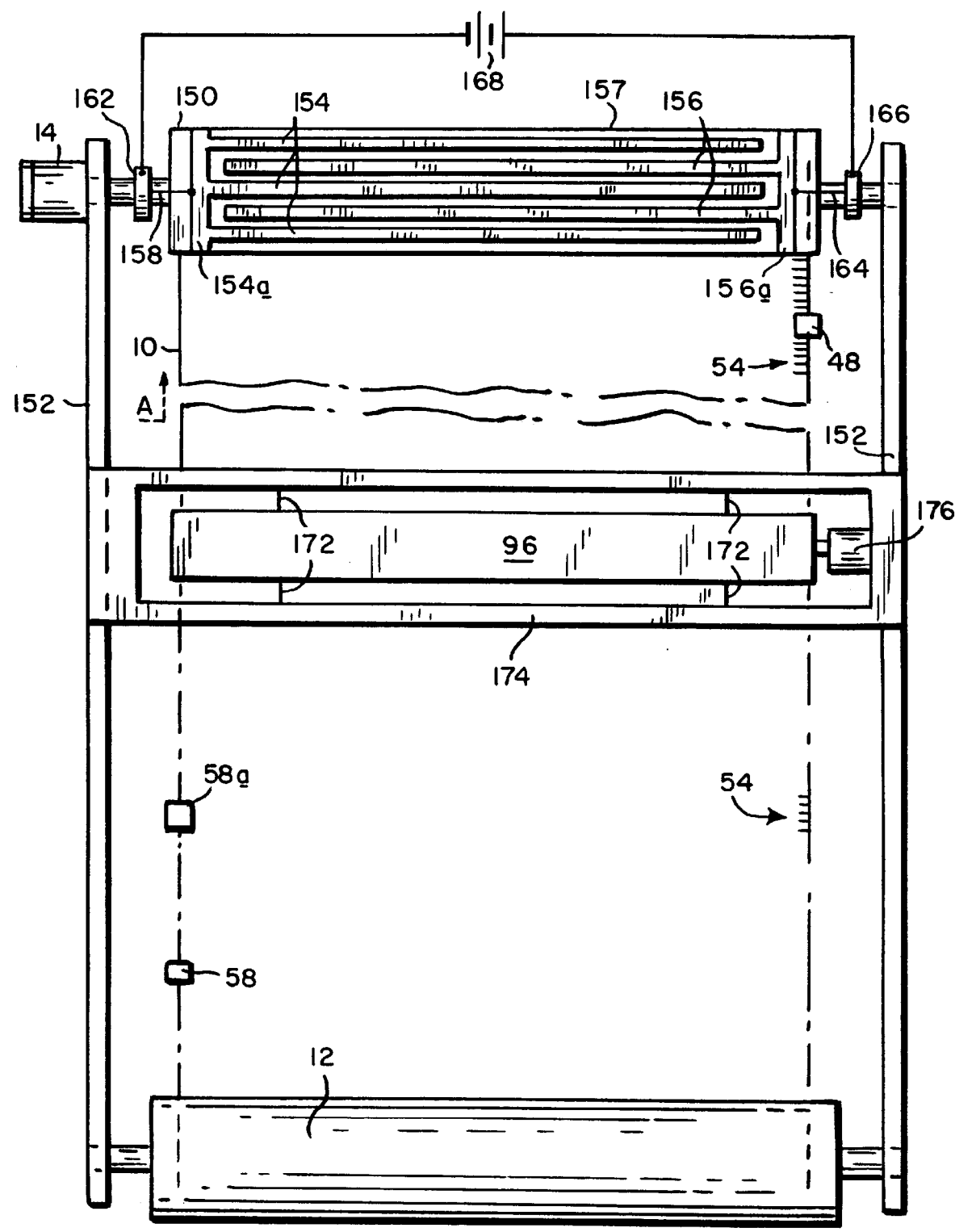
FIG. 6 is a plan view illustrating another carrier embodiment for use in this positioning system.

Refer now to FIG. 6 which illustrates a slightly different transport embodiment for our system than the one described in connection with FIGS. 1 and 2. The FIG. 6 transport has several elements in common with the FIG. 1 transport and these bear the same identifying numerals.

In the FIG. 6 transport, the belt loop 10 is stretched between a pair of rollers 12 and 150 rotatably mounted to a machine frame 152, the latter roller are being driven by motor 14 mounted to that frame. In this transport, instead of taking steps to control the drift of belt 10 on the rollers, such drift is minimized or eliminated by preventing slippage of belt 10 relative to roller 150 by utilizing an electrostatic hold down arrangement similar to the one described above for the substrate S. More particularly, the cylindrical surface of roller 150 is provided with arrays of interleaved strip electrodes 154 and 156 which extend along the length of the cylinder. Preferably the electrodes 154 and 156 are covered with an insulating film 157. Corresponding ends of the electrodes 154 are connected by a circumferential bus 154a at one end of the roller. A similar bus 156a at the opposite end of the roller connects the corresponding ends of electrodes 156. Bus 154a is connected by a lead 158 to a slip ring 162 on one end of the roller shaft. A similar lead 164 connects bus 156a to a slip ring 166 at the opposite end of the roller shaft. The slip rings are connected electrically to a source of high voltage illustrated by the battery 168. Typically, the voltage source supplies a voltage in the order 2–3K volts so that strong electric fields are developed between the electrodes 154 and 156 as described above in connection with the belt loop electrodes.

When a high voltage is present between the electrodes 154 and 156, the resultant electrostatic fields effectively "pin" the segment of the belt loop 10 that is wrapped around roller 150 to the surface of the roller thereby minimizing or preventing relative slippage of the belt loop relative the roller. Yet, the holding force is minimal at the line of departure of the belt from the roller 150 so that such fields do not materially effect the advancing motion of the belt.

As before, a sensor 48 is provided to detect the clock tracks 52a on belt loop 10. Likewise, detectors 58 and 58a are provided to monitor the lateral position and skew of the belt loop in the event that there is any residual drift of the belt loop on rollers 12 and 150. Since such drift is minimal in this case, the detectors 58 and 58a may simply monitor the location of the edge of the belt loop 10 or the lateral position of the electrode bus 34a (FIG. 1) on belt loop 10.

As described above, the signals from the detectors 58 and 58a are processed by controller 15 which produces control signals to shift the lateral position of the print heads 96 so that the print elements of the print head write at the appropriate pixel locations on the print cylinders 92 that will cause those locations to print in register of the substrate S when the substrate reaches the operative print station.

In the FIG. 6 apparatus, each print head 96 is movably supported by way of flat leaf springs 172 to a rectangular bracket 174 mounted to the machine frame 152. The leaf springs 172 are arranged on edge and connected between the print head 96 and the bracket 174 to allow the print head only a single degree of freedom in the lateral direction. The print head 96 has a normal home position over belt loop 10. It may be moved from this position by a piezoelectric actuator 176 mounted to one end of bracket 174. When the actuator 176 is energized by control signals from controller 15, it shifts the print head 96 laterally in opposition to the bias of springs 172. As such, the actuators 176 function to predictively shift the print heads 96 laterally in the same way as the lead screws 98 described above. However, the actuators are more responsive than the lead screws.

It will be seen from the foregoing that my transport system enables the routing and positioning of documents and other articles with a high degree of accuracy. Therefore, the system should find wide application wherever there is a need to perform a succession of operations at particular locations on planar articles of one kind or another.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense. It It will also be understood that the following claims are intended to cover all of the generic and specific features of the invention described herein.

We claim:

1. A positioning system comprising a support;

a pair of spaced-apart rollers rotatably mounted to the support parallel to one another, each roller having a cylinder surface and an axis of rotation;

an endless belt loop engaged around and stretched between said rollers to form an upper belt stretch and a lower belt stretch, said belt loop having an outer surface for receiving a substrate;

means for rotating at least one of said rollers so that the upper belt stretch moves in a selected longitudinal direction perpendicular to said roller axes;

an electrostatic hold down grid incorporated into the cylindrical surface of at least one of said rollers, said grid including first and second arrays of electrodes, and a voltage source for applying an electrical potential difference between the first and second arrays of electrodes to produce electrostatic fields emanating from said cylindrical surface which are sufficiently strong to inhibit slippage of the belt loop relative to the cylindrical surface when said one of said rollers is rotated.

2. The positioning system defined in claim 1 and further including a high friction insulating coating on the cylindrical surface of said at least one of said rollers.

3. The positioning system defined in claim 2 wherein said coating is silicone.

* * * * *